(12) United States Patent
Kogut

(10) Patent No.: US 9,598,024 B2
(45) Date of Patent: Mar. 21, 2017

(54) TAILGATE RETRIEVAL TOOL AND STORAGE COMPARTMENT

(71) Applicant: Andrew W. S. Kogut, West Chatham, MA (US)

(72) Inventor: Andrew W. S. Kogut, West Chatham, MA (US)

( * ) Notice: Subject to any disclaimer, the term of this patent is extended or adjusted under 35 U.S.C. 154(b) by 0 days.

(21) Appl. No.: 14/833,778

(22) Filed: Aug. 24, 2015

(65) Prior Publication Data

US 2016/0236625 A1    Aug. 18, 2016

Related U.S. Application Data

(60) Provisional application No. 62/117,354, filed on Feb. 17, 2015.

(51) Int. Cl.
| | |
|---|---|
| *B60R 11/00* | (2006.01) |
| *B60D 1/00* | (2006.01) |
| *B62D 33/027* | (2006.01) |
| *B60R 11/06* | (2006.01) |

(52) U.S. Cl.
CPC .............. *B60R 11/00* (2013.01); *B60D 1/00* (2013.01); *B60R 11/06* (2013.01); *B62D 33/0273* (2013.01); *B60R 2011/004* (2013.01)

(58) Field of Classification Search
CPC ....... B62D 33/0273; B60R 3/02; B60R 11/06; B60R 7/12; B60R 11/00; B60R 2011/004; B60D 1/00
See application file for complete search history.

(56) References Cited

U.S. PATENT DOCUMENTS

| | | |
|---|---|---|
| 3,081,126 A | 3/1963 | Theberge |
| 5,800,004 A | 9/1998 | Ackeret |
| 6,199,930 B1 | 3/2001 | Riley |
| 6,450,557 B1 | 9/2002 | Martinez |
| 6,502,885 B1 | 1/2003 | Gammon et al. |
| 6,905,158 B1 * | 6/2005 | Bastian .............. B62D 33/0273 280/164.1 |
| 7,478,851 B2 | 1/2009 | Geller |
| 7,549,692 B2 | 6/2009 | Washington |
| 8,029,035 B1 | 10/2011 | Bottner |
| 8,915,529 B1 | 12/2014 | Bond |

(Continued)

FOREIGN PATENT DOCUMENTS

| | | |
|---|---|---|
| DE | 102005059726 A1 | 6/2007 |
| FR | 2871423 A1 | 12/2005 |

OTHER PUBLICATIONS

Du-Ha Storage Solutions for Pickup Trucks, www.du-ha.com: accessed om May 19, 2015; 6 pages.

*Primary Examiner* — Corey Skurdal
(74) *Attorney, Agent, or Firm* — Daly, Crowley, Mofford & Durkee, LLP

(57) ABSTRACT

An apparatus comprises a mounting bracket configured to mount to a surface of a body panel of a vehicle, adjacent to an opening in the body panel. A latch mechanism is coupled to the mounting bracket. An elongate member comprising a body and a coupling mechanism is configured to couple to the latch mechanism so that, when secured, at least a portion of the body of the elongate member is positioned within an inside cavity of the body panel of the vehicle. In an embodiment, the body panel is a truck tailgate and the elongate member is a retrieval hook.

20 Claims, 6 Drawing Sheets

(56) References Cited

U.S. PATENT DOCUMENTS

| | | |
|---|---|---|
| 9,016,748 B1 | 4/2015 | Ardigo |
| 2004/0113450 A1 | 6/2004 | Fielding |
| 2009/0039231 A1 | 2/2009 | McLaughlin |
| 2012/0325877 A1 | 12/2012 | Franks |

* cited by examiner

TAILGATE RETRIEVAL TOOL AND STORAGE COMPARTMENT

RELATED APPLICATIONS

This application claims priority to and benefit of U.S. Provisional Patent Application No. 62/117,354 (filed Feb. 17, 2015) which is incorporated here by reference in its entirety.

FIELD

This disclosure relates to storage containers and, more particularly, to storage containers for containing a tool within a body panel of a vehicle.

BACKGROUND

Many vehicles carry cargo from place to place. Trucks, trains, airplanes, cars, boats, and other vehicles often have storage compartments or beds that can be used to transport cargo.

Sometimes the cargo must be stored in an area of the storage compartment that is difficult to reach. For example, if the cargo is heavy it may be required to be placed in a certain portion of the storage compartment or bed so that the payload is properly distributed. As another example, if there is a large amount of cargo, at least some of the cargo might be placed in an out-of-reach area of the storage compartment so that the rest of the cargo can fit. And also, the cargo can shift into an out-of-reach area during transport. For example, if a pickup truck brakes quickly, cargo in the truck bed may slide toward the front of the truck where it is difficult to reach.

SUMMARY

In an embodiment, an apparatus comprises a mounting bracket configured to mount to a surface of a tailgate adjacent to an opening in the tailgate; a latch mechanism coupled to the mounting bracket; an elongate member comprising a body and a coupling mechanism configured to couple to the latch mechanism so that, when secured, at least a portion of the body of the elongate member is positioned within an inside cavity of the tailgate.

In another embodiment, a vehicle comprises a rear door; a mounting bracket configured to mount to a surface of the rear door adjacent to an opening in the rear door; a latch mechanism coupled to the mounting bracket; an elongate member comprising a body and a coupling mechanism configured to couple to the latch mechanism so that, when secured, at least a portion of the body of the elongate member is positioned within an inside cavity of the rear door.

In another embodiment, a vehicle comprises a body panel; a mounting bracket configured to mount to a surface of the body panel adjacent to an opening in the body panel; a latch mechanism coupled to the mounting bracket; an elongate member comprising a body and a coupling mechanism configured to couple to the latch mechanism so that, when secured, at least a portion of the body of the elongate member is positioned within an inside cavity of the body panel of the vehicle.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
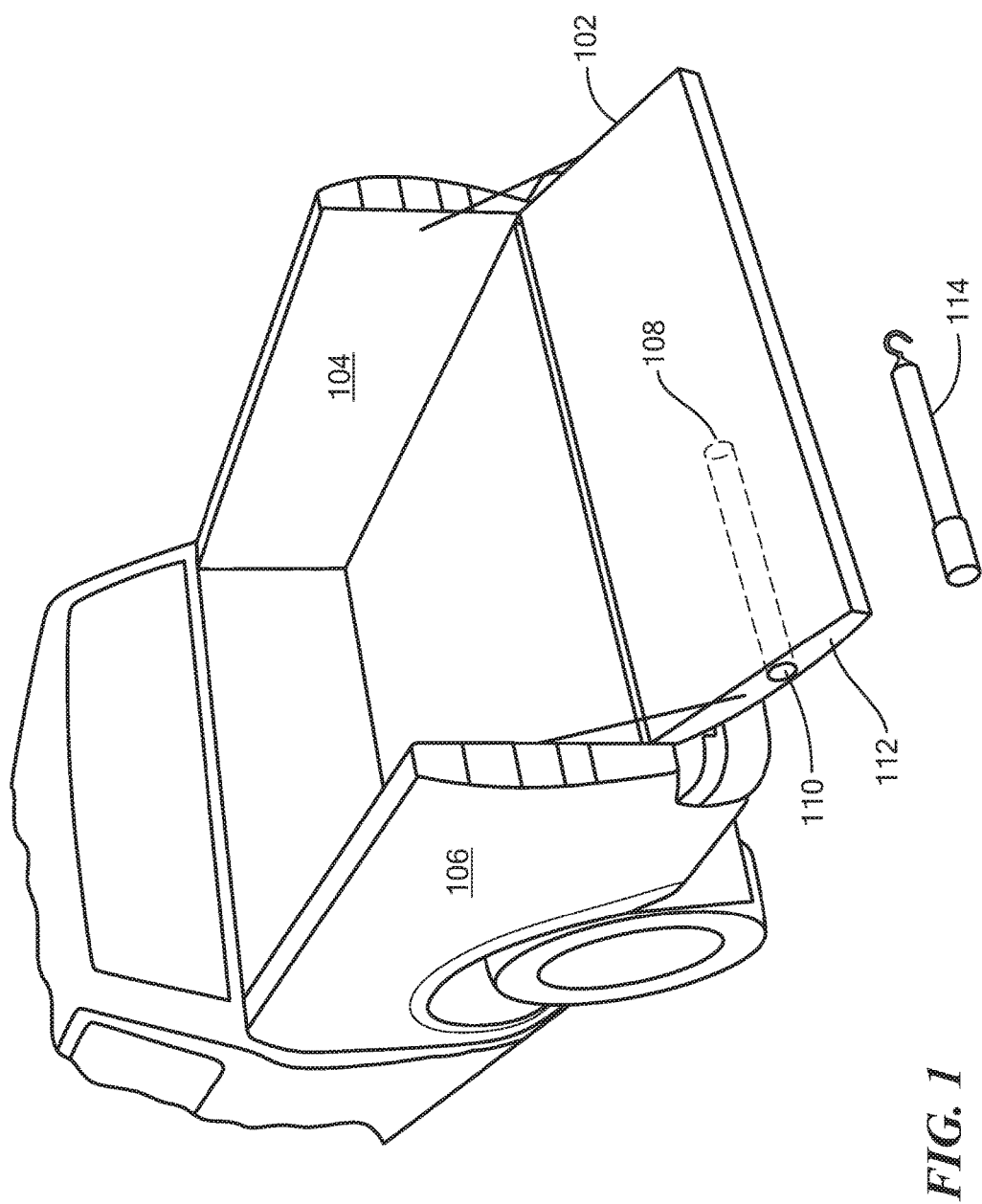
FIG. 1 is a diagram of a truck bed with a storage area for a tool.

FIG. 1 is a diagram of a truck bed 100 including a tailgate 102 and side walls 104 and 106. Tailgate 102 is shown in the open position to provide easier access to the truck bed 100.

Tailgate 102 may be a three-dimensional structure having an internal cavity 108, comprising a space between the walls of the tailgate. In an embodiment, cavity 108 may be a cylindrical cavity as shown in FIG. 1. In other embodiments, cavity 108 may be any opening or space of any shape internal to tailgate 102.

Tailgate 102 also includes an opening 110 on a side 112 of the tailgate. Opening 110 provides access to cavity 108 so that a tool, such as retrieval hook 114, can be inserted into opening 110 and stored in cavity 108. In other embodiments, opening 110 may be located on an opposite side, top, bottom, or any other surface of tailgate 102. Tailgate 102 may also include multiple openings (not shown) into which various tools can be inserted and stored. In embodiments, tailgate 102 may include a separate cavity associated with each opening, one or more shared cavities associated with more than one opening, or a single cavity associated with all openings in tailgate 102.

In an embodiment, tailgate 102 may be attached to truck bed 100 by a hinge or series of hinges. Tailgate 102 may be closed by being lifted up so that it forms a rear wall of the truck bed 100. Tailgate 102, when closed, may latch to side walls 104 and 106 so that it does not inadvertently open. When in the closed position, opening 110 may be hidden from view between tailgate 102 and side wall 106. In this embodiment, if a user wants to access opening 110, the user must first open the tailgate. In other embodiments, opening 110 may be positioned so that it is accessible when the tailgate is opened, when the tailgate is closed, or both.

Figure 2:
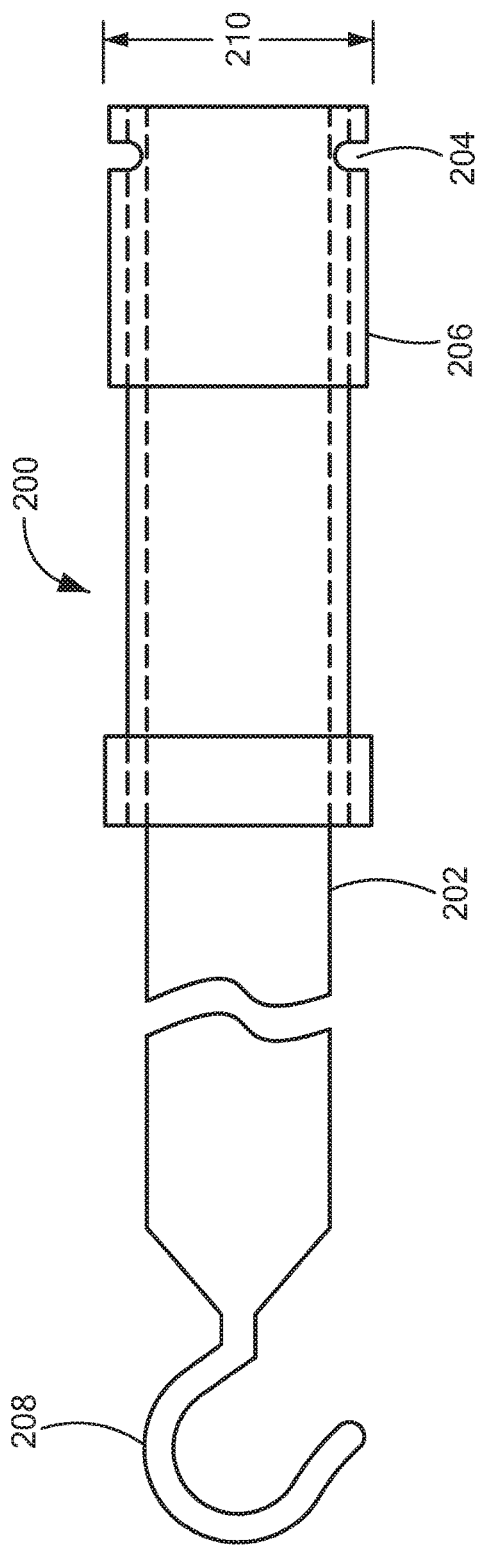
FIG. 2 is a diagram of a retrieval tool.

Referring to FIG. 2, an elongate member 200 that may be stored within cavity 108 includes a body 202 and a coupling mechanism 204. As will be described below, coupling mechanism 204 may engage with a mount and/or latch to secure elongate member 200 within cavity 108 for storage. Elongate member 200 may also include a handle 206 that can be grasped by a user. In an embodiment, coupling mechanism 204 may be included as part of handle 206 as shown. However, this is not required. Coupling mechanism 206 may be included as part of body 202 or may be a separate part attached to elongate member 200.

As shown, coupling mechanism 204 may be a groove or slot that can be engaged by a locking mechanism or mount. In general, however, coupling mechanism 204 may be any type of device that can engage with a mount or bracket so that elongate member can be secured in place within cavity 108. Examples include a groove, a protrusion, a ballooning or telescoping member, a cover or latch, etc.

In an embodiment, body 202 may be a telescoping body that can be extended or shortened. When body 202 is shortened, it may have a length that is sufficiently short so that elongate member 200 can fit within cavity 108. When body 202 is extended, its length may or may not be sufficiently short to fit within cavity 108, depending on the length of body 202 and the size of cavity 108.

In an embodiment, elongate member 200 may include a hook 208 on an end opposite handle 206. Hook 208 may have a width 210 that is less than the diameter of opening 110 so that hook 208 can fit through opening 110. In other embodiments, hook 208 may be a foldable or retractable hook which, when folded or retracted, can fit through opening 110.

As shown, in an embodiment, elongate member 200 may be a retrieval hook. Although shown as a retrieval hook with a hook 208 on one end, elongate member 200 may be any type of tool including, but not limited to, a hammer, a bat, a rake, a ruler, a level, or any other type of useful tool that can be inserted into opening 110 and stored in cavity 108. In some embodiments, elongate member 200 may be a relatively large tool that fills cavity 108. In other embodiments, elongate member 200 may be a smaller tool that does not fully fill cavity 108.

Figure 3A:
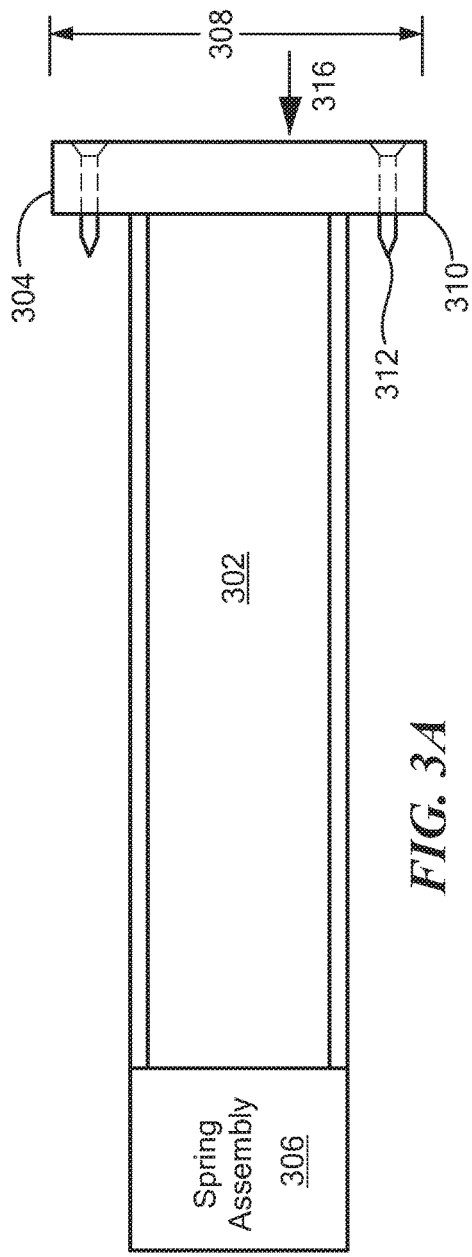
FIG. 3A and FIG. 3B are diagrams of a storage container.

Referring to FIG. 3A, a storage container 300 that may be configured to hold elongate member 200 within. Storage container 300 may include a sheath 302, a mounting bracket 304, and a spring assembly 306. In an embodiment, sheath 302 is a cylindrical sheath. In other embodiments sheath 302 may have a rectangular shape or any other shape capable of enclosing elongate member 200. Storage container 300 may be installed in tailgate 102 so that sheath 302 and spring assembly 306 are contained inside cavity 108. Mounting bracket 304 may engage the outer surface of opening 110 (i.e. the surface of side 112). In an embodiment, the diameter 308 of mounting bracket 304 may be larger than the diameter of opening 110 so that inner surface 310 can engage the outer surface of tailgate side 112. Mounting bracket 304 may be fastened to side 112 (by screws 312, glue, rivets, or any other type of fastener) so that storage container 300 is permanently or semi-permanently installed in tailgate 102.

In an embodiment, diameter 314 of sheath 302 may be smaller than the diameter of opening 110 so that storage container 300 can be inserted into opening 110 during installation. The diameter of spring assembly 306 may also be smaller than the diameter of opening 110 so it can be inserted into opening 110.

In embodiments, at least some portions of storage container 300 may be constructed from metals, plastics, graphite, carbon-fiber, fiberglass, or any other suitable material. In an embodiment, storage container 300 may be constructed from a hard or rigid material. In other embodiments, storage container and/or sheath 302 may be constructed of a non-rigid material (e.g. a woven cloth or non-rigid plastic) so that storage container 300 forms a sock-like enclosure. In some embodiments, some portions of storage container 300 may be metal and other portions plastic, and some portions of storage container 300 may be rigid while other portions are non-rigid. For example, in one embodiment, sheath 302 may be a non-rigid material while mounting bracket 304 and/or spring assembly 306 are constructed from a rigid material.

Figure 3B:
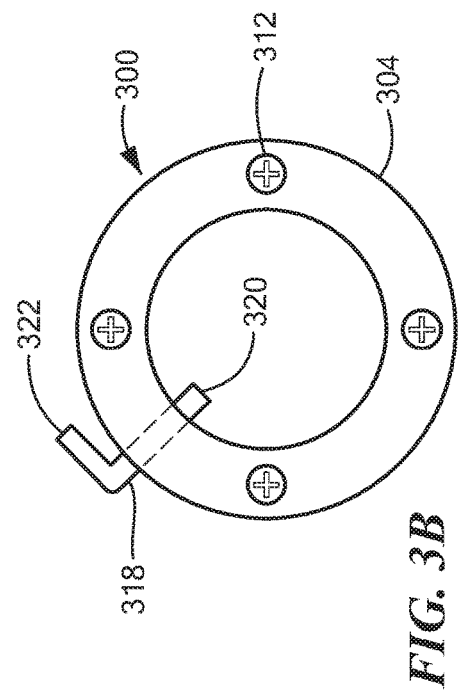

FIG. 3B is a diagram of storage container 300 as viewed from the direction of arrow 316. As shown, in an embodiment, mounting bracket 304 may be a flange.

Storage container 300 may also include a locking mechanism 318. In the embodiment shown, locking mechanism 318 may be a pin having an end 320 which, when moved toward the center axis of storage container 300 can engage and secure elongate member 200 in place. For example, assume that elongate member has been inserted into storage container 300. End 320 of pin 318 may move toward the center axis of storage container 300 until end 320 engages and fits within groove 204 of elongate member 200 (See FIG. 2). When end 320 is fitted within groove 204, it may hold elongate member 200 in place and prevent elongate member 200 from moving further into or moving out of storage container 300. In an embodiment, pin 318 may be spring loaded and biased toward the center axis of storage container 300 so that, when elongate member is inserted into storage container 300, pin 318 can automatically engage groove 204 to hold elongate member 200 in place. Pin 318 may also have a handle 322 with which a user can disengage pin 318 from groove 204 in order to remove elongate member 200 from storage container 302. Although shown as an angled portion of pin 318, handle 322 may be any type of handle including, but not limited to an angled portion, a ball or sphere coupled to pin 318, a rough or scored area of pin 318 that can increase friction when held, a flattened portion of pin 318, etc.

Figure 4A:
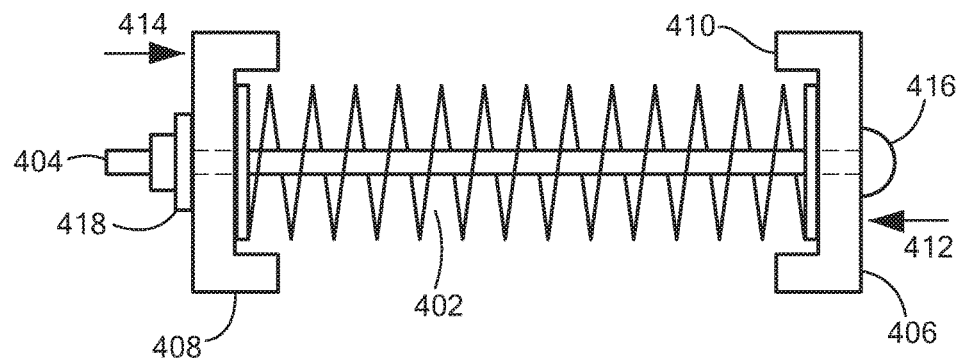
FIG. 4A and FIG. 4B are diagrams of embodiments of a spring assembly.

Referring to FIG. 4A, an embodiment of a spring assembly 400 may be the same as or similar to spring assembly 306. Spring assembly 400 may include a spring 402 positioned around a spindle 404. A first plate 406 and a second plate are positioned on either end of spring 402. The plates may include protrusions 410 to keep spring 402 centered around spindle 404.

Plate 406, plate 408, or both may be movably coupled to spindle 404 so that, if a force is applied in the direction of arrow 412 or 414, plate 406 and/or 408 may be pushed toward the other plate to compress spring 402.

Spring assembly may also include stopper 416 and stopper 418 to prevent plate 406 and plate 408 from traveling beyond the end of spindle 404.

In an embodiment, spindle 404 may be a threaded screw, stopper 416 may be the head of the screw, stopper 418 may comprise a nut and washer, and plates 406 and 408 may be washers.

Figure 4B:
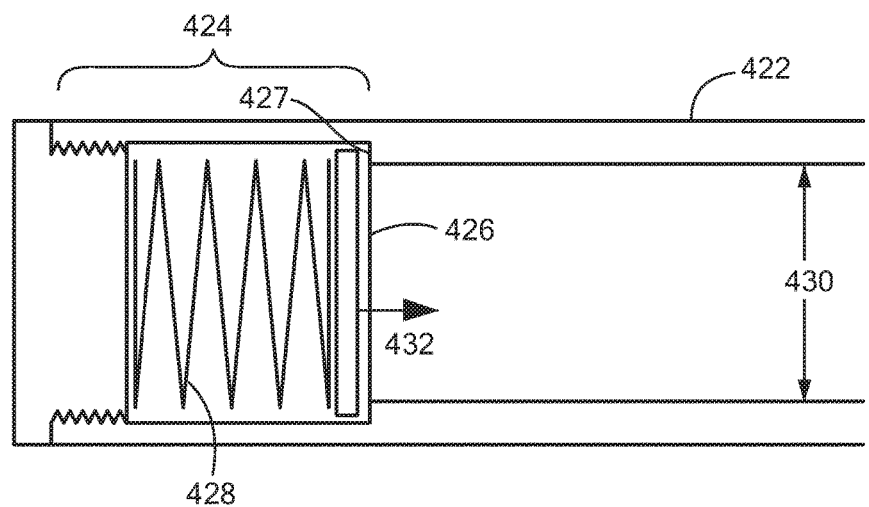

Referring to FIG. 4B, another embodiment of a spring assembly 420 may be the same as or similar to spring assembly 306. In this embodiment, the body 422 of sheath 302 may include a section 424 having an inner diameter that is larger than the inner diameter 430 of the rest of sheath 302, so as to form a ridge 426 on the inside of body 422. A plate 428 is positioned between ridge 426 and a spring 428. The diameter of plate 426 is larger than inner diameter 430 so that, when spring 428 pushes plate 426 in the direction of arrow 432, plate 426 presses against ridge 426 which acts as a stopper.

Spring assembly 420 also includes an end cap 434 to hold spring 428 within section 424. In an embodiment, end cap 434 and body 422 may be threaded so that end cap 434 can be screwed onto body 422. In other embodiments, end cap 434 may be glued, welded, bolted, or otherwise fastened to body 422 using any desirable fastening technique.

Figure 5:
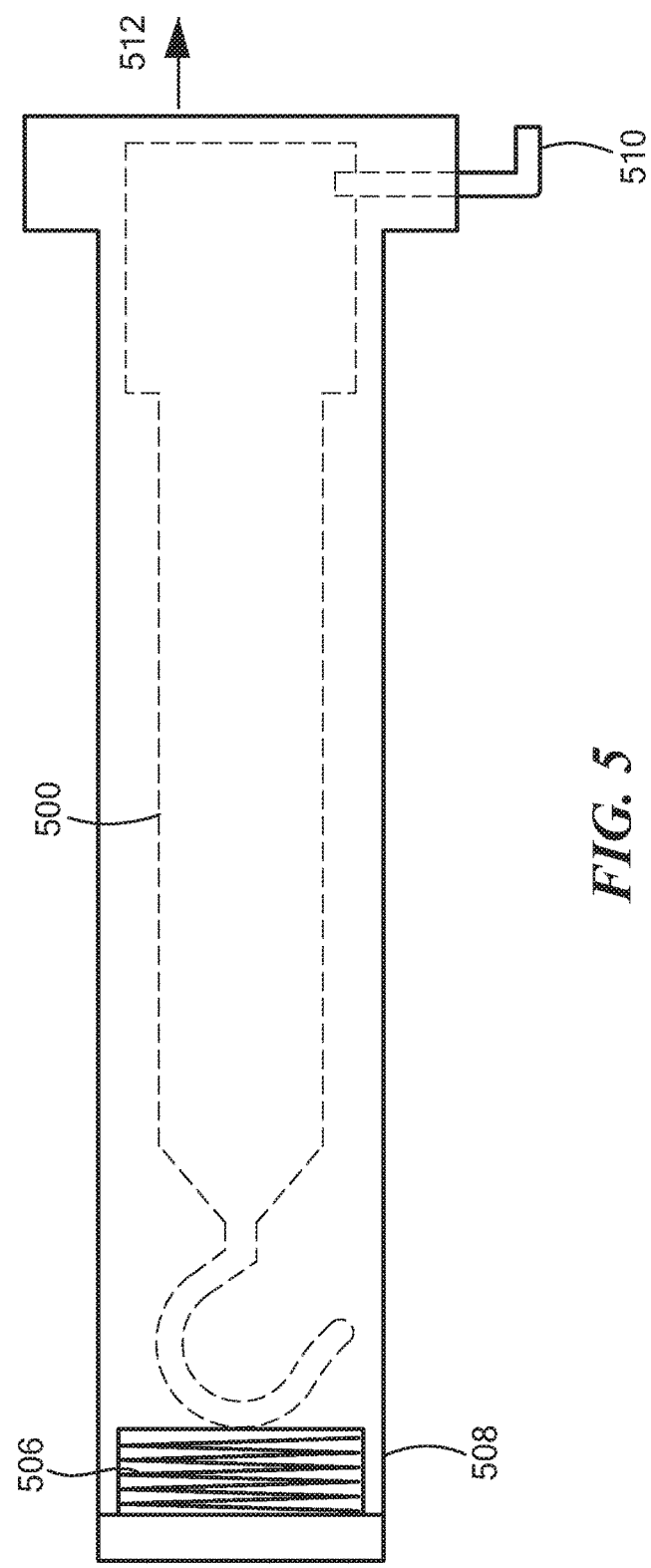
FIG. 5 is a diagram of a storage container containing a retrieval tool.

FIG. 5 is a diagram of a retrieval hook 500 positioned for storage within a storage container 502. Retrieval hook 500 may be the same as or similar to elongate member 200, and storage container 502 may be the same as or similar to storage container 300. In an embodiment, the length of retrieval hook 500 may be similar to or slightly longer than the length of the inner cavity of storage container 502 so that, when pushed into storage container 300, the end 504 of retrieval hook 500 compresses spring 506 in spring assembly 508 (which may be the same as or similar to spring assembly 306). While spring 506 is compressed, locking mechanism 510 (which may be the same as or similar to locking mechanism 318) may engage the end of retrieval hook 500 to secure it in place. Because spring 506 is compressed, retrieval hook 500 may be under compression while stored and locked in place so that it does not move during transport. When locking mechanism 510 is disengaged, spring assembly 508 may push the end of retrieval hook 500 out of storage container 510 in the direction of arrow 512 so that a user can more easily grab retrieval hook 500.

Figure 6A:
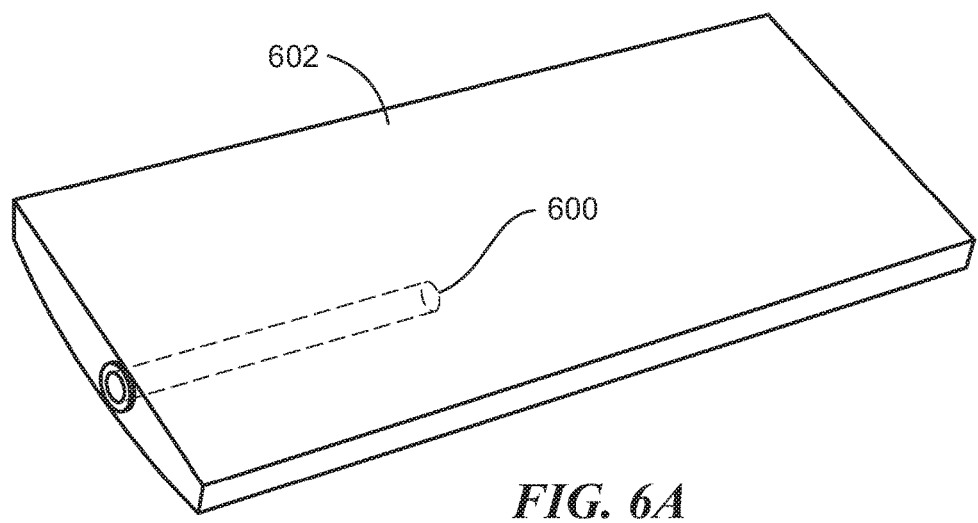
FIG. 6A and FIG. 6B are diagrams of a storage container installed in a tailgate.
Figure 6B:
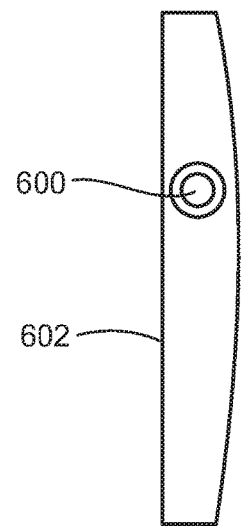

Referring to FIGS. 6A and 6B, storage container 600 may be the same as or similar to storage container 300. In FIG. 6A and FIG. 6B, storage container 600 is shown installed in a tailgate 602. In operation, a user may store an elongate member (e.g. a retrieval hook or other tool) within storage container 600 as described above. When the user needs to reach a difficult to reach object, for example in the bed of a pickup, the user can open the tailgate, remove the retrieval hook from storage container 600, and use the hook to retrieve the item. When done, the user can once again store the retrieval hook within storage container 600.

In an embodiment, storage container 600 may be installed in an already assembled tailgate. Storage container 600 may also be installed in other locations in a vehicle including, but not limited to, a tailgate, bumper, fender, body panel, etc. For example, storage container 600 may be sold as an after-market product that can be installed in a tailgate, rear door or hatchback hatch, bumper, fender, or other body panel of a vehicle. In other embodiments, storage container 600 may be designed into the tailgate (or other vehicle body part) and installed or manufactured as part of the original vehicle. In certain embodiments, the sheath 302 may not be necessary if the body part into which the assembly is installed has an inner cavity that can act similarly to sheath 302 to store an elongate member.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

The invention claimed is:

1. An apparatus comprising:
a mounting bracket configured to mount to an outer surface of a tailgate adjacent to an opening in the tailgate, wherein the mounting bracket comprises a flange having a size larger than the opening and a surface that mounts to the outer surface of the tailgate;
a latch mechanism coupled to the mounting bracket;
an elongate member detachable from the mounting bracket and insertable into the opening, the elongate member comprising a body and a handle, the body comprising a rod having a diameter smaller than the opening to allow the elongate member to be inserted into and removed from the opening, the handle comprising a coupling mechanism configured to engage with the latch mechanism so that the elongate member can be secured to the mounting bracket such that, when secured, at least a portion of the body of the elongate member is positioned within an inside cavity of the tailgate.

2. The apparatus of claim 1 wherein the elongate member comprises a hook, the handle is positioned on one end of the rod, and the hook is positioned on an opposite hook-end of the rod, the hook having a size smaller than the opening so the hook-end can be inserted into and removed from the opening.

3. The apparatus of claim 1 further comprising a sheath extending from the mounting bracket into the cavity of the tailgate, the sheath configured to encompass the body of the elongate member.

4. The apparatus of claim 1 wherein the latch mechanism comprises a spring and a locking mechanism to secure the elongate member.

5. The apparatus of claim 1 wherein the spring and locking mechanism are positioned so that, when secured, a majority portion of the body of the elongate member is positioned within the inside cavity of the tailgate.

6. The apparatus of claim 1 further comprising:
a sheath extending from the mounting bracket into the cavity of the tailgate, the sheath configured to encompass the body of the elongate member; and
a spring assembly configured to provide a compression force when the elongate member is positioned within the sheath;
wherein the latch mechanism is positioned at one end of the sheath and the spring assembly is positioned at an opposite end of the sheath.

7. The apparatus of claim 1 wherein the body of the elongate member has a length at least two-thirds the length of a truck bed.

8. The apparatus of claim 1 wherein the opening is on a side surface of the tailgate so that the opening is hidden while the tailgate is closed and revealed when the tailgate is open.

9. The apparatus of claim 1 wherein the body of the elongate member is a telescoping body such that a length of the body increases or decreases as the body is telescoped.

10. A vehicle comprising:
a rear door;
a mounting bracket configured to mount to an outer surface of the rear door adjacent to an opening in the rear door, wherein the mounting bracket comprises a flange having a size larger than the opening and a surface that mounts to the outer surface of the rear door;
a latch mechanism coupled to the mounting bracket;
an elongate member detachable from the mounting bracket and insertable into the opening, the elongate member comprising a body and a handle, the body comprising a rod having a diameter smaller than the opening to allow the elongate member to be inserted into and removed from the opening, the handle comprising a coupling mechanism configured to engage with the latch mechanism so that the elongate member can be secured to the mounting bracket such that, when secured, at least a portion of the body of the elongate member is positioned within an inside cavity of the rear door.

11. The apparatus of claim 10 further comprising a sheath extending from the mounting bracket into the cavity of the rear door, the sheath configured to encompass the body of the elongate member.

12. The apparatus of claim 10 wherein the latch mechanism comprises a spring and a locking mechanism to secure the elongate body in place.

13. The apparatus of claim 12 wherein the locking mechanism and spring are positioned so that, when secured, a majority portion of the body of the elongate member is positioned within the inside cavity of the rear door.

14. The apparatus of claim 10 wherein the elongate member comprises a retrieval hook.

15. The apparatus of claim 14 wherein the body of the elongate member has a length at least two-thirds the length of a storage area of the vehicle.

16. The apparatus of claim 10 wherein the opening is on a side surface of the rear door so that the opening is hidden while the rear door is closed and revealed when the rear door is open.

17. The apparatus of claim 10 wherein the vehicle is a pickup truck and the rear door is a tailgate of the pickup truck.

18. A vehicle comprising:

a body panel;

a mounting bracket configured to mount to an outer surface of the body panel adjacent to an opening in the body panel, wherein the mounting bracket comprises a flange having a size larger than the opening and a surface that mounts to the outer surface of the body panel;

a latch mechanism coupled to the mounting bracket;

an elongate member detachable from the mounting bracket and insertable into the opening, the elongate member comprising a body and a handle, the body comprising a rod having a diameter smaller than the opening to allow the elongate member to be inserted into and removed from the opening, the handle comprising a coupling mechanism configured to engage with the latch mechanism so that the elongate member can be secured to the mounting bracket such that, when secured, at least a portion of the body of the elongate member is positioned within an inside cavity of the body panel of the vehicle.

19. The vehicle of claim 18 wherein the body panel comprises a bumper or fender of the vehicle.

20. The vehicle of claim 18 further comprising a sheath extending from the mounting bracket into the cavity of the body panel of the vehicle, the sheath configured to encompass the body of the elongate member.

* * * * *